United States Patent [19]

Overman

[11] Patent Number: 4,742,208
[45] Date of Patent: May 3, 1988

[54] WELDING SYSTEM WITH ELECTRONIC CONTROL

[75] Inventor: John A. Overman, Bolingbrook, Ill.

[73] Assignee: ESAB Welding Products, Inc., Chicago, Ill.

[21] Appl. No.: 918,014

[22] Filed: Oct. 14, 1986

[51] Int. Cl.⁴ .............................................. B23K 9/10
[52] U.S. Cl. ........................... 219/137 PS; 219/130.1; 363/58
[58] Field of Search ..................... 219/130.51, 137 PS, 219/130.1; 363/56, 58

[56] References Cited

U.S. PATENT DOCUMENTS

| | | | |
|---|---|---|---|
| 3,781,508 | 12/1973 | Dauer et al. | 219/130.51 |
| 4,410,935 | 10/1983 | Dang | 363/56 |
| 4,479,046 | 10/1984 | Mizuno et al. | 219/130.51 |
| 4,520,255 | 5/1985 | Bredenkamp et al. | 219/130.1 |

FOREIGN PATENT DOCUMENTS 2724741 12/1978 Fed. Rep. of Germany ........ 363/56

58-132368 8/1983 Japan .............................. 219/130.51

OTHER PUBLICATIONS

W. Fragale et al., "Using the Power MOSFET's Integral Reverse Rectifier", Proceedings of the Seventh National Solid-State Power Conversion Conference, 3/1980.

*Primary Examiner*—Clifford C. Shaw
*Attorney, Agent, or Firm*—James G. Staples

[57] ABSTRACT

A welding system with an electronic control includes four switching elements coupled together to form a bridge. An inductor with a center tap is located between two legs of the bridge. A load, including an output electrode and the metal parts being welded, is coupled between the center tap of the inductor and the other two branches of the bridge. Two of the switching elements are turned on and off at a relatively high rate to control the power to the load. The other two are turned on and off at a relatively low rate to control the duty cycle and polarity of the load voltage and current.

12 Claims, 4 Drawing Sheets

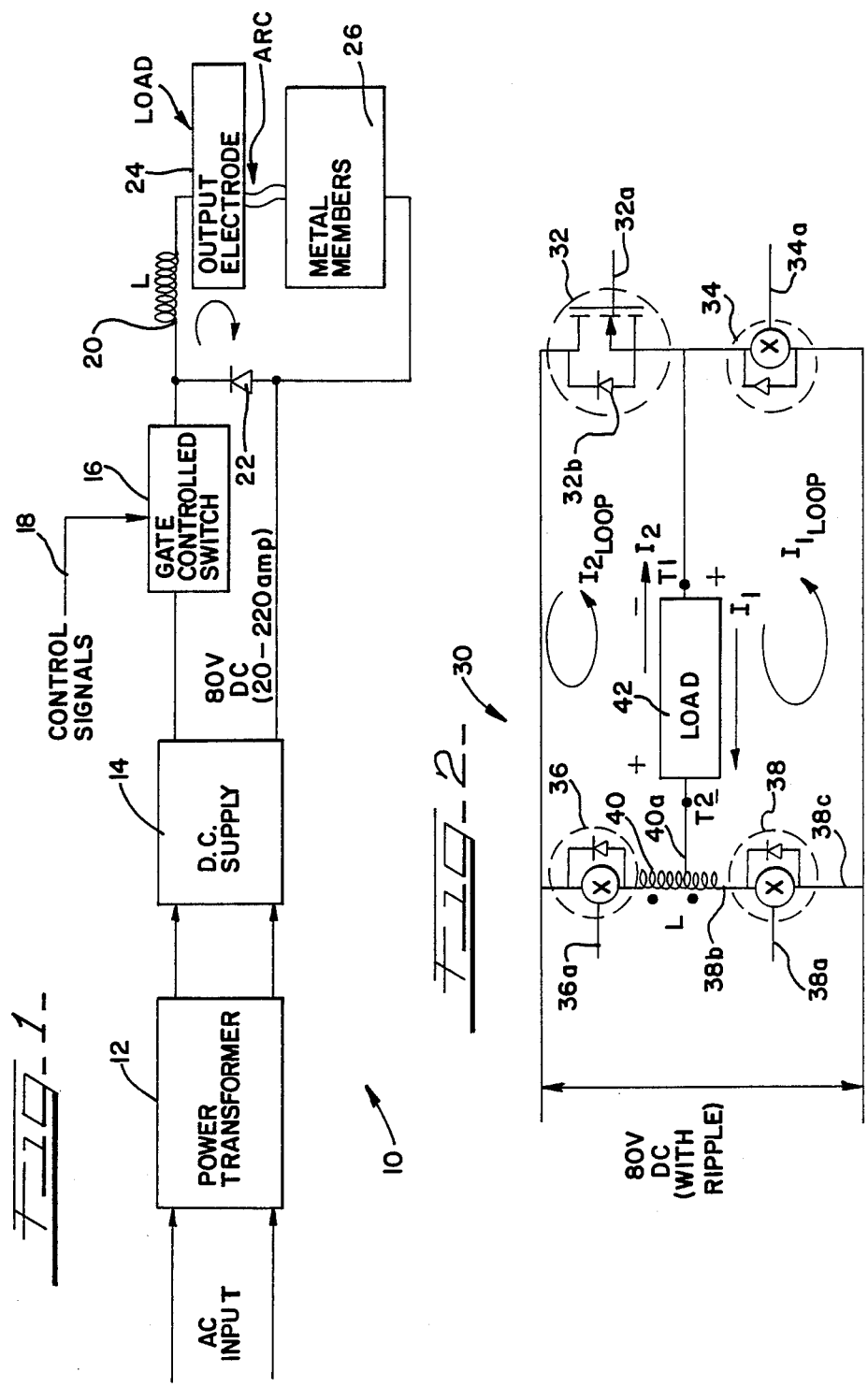

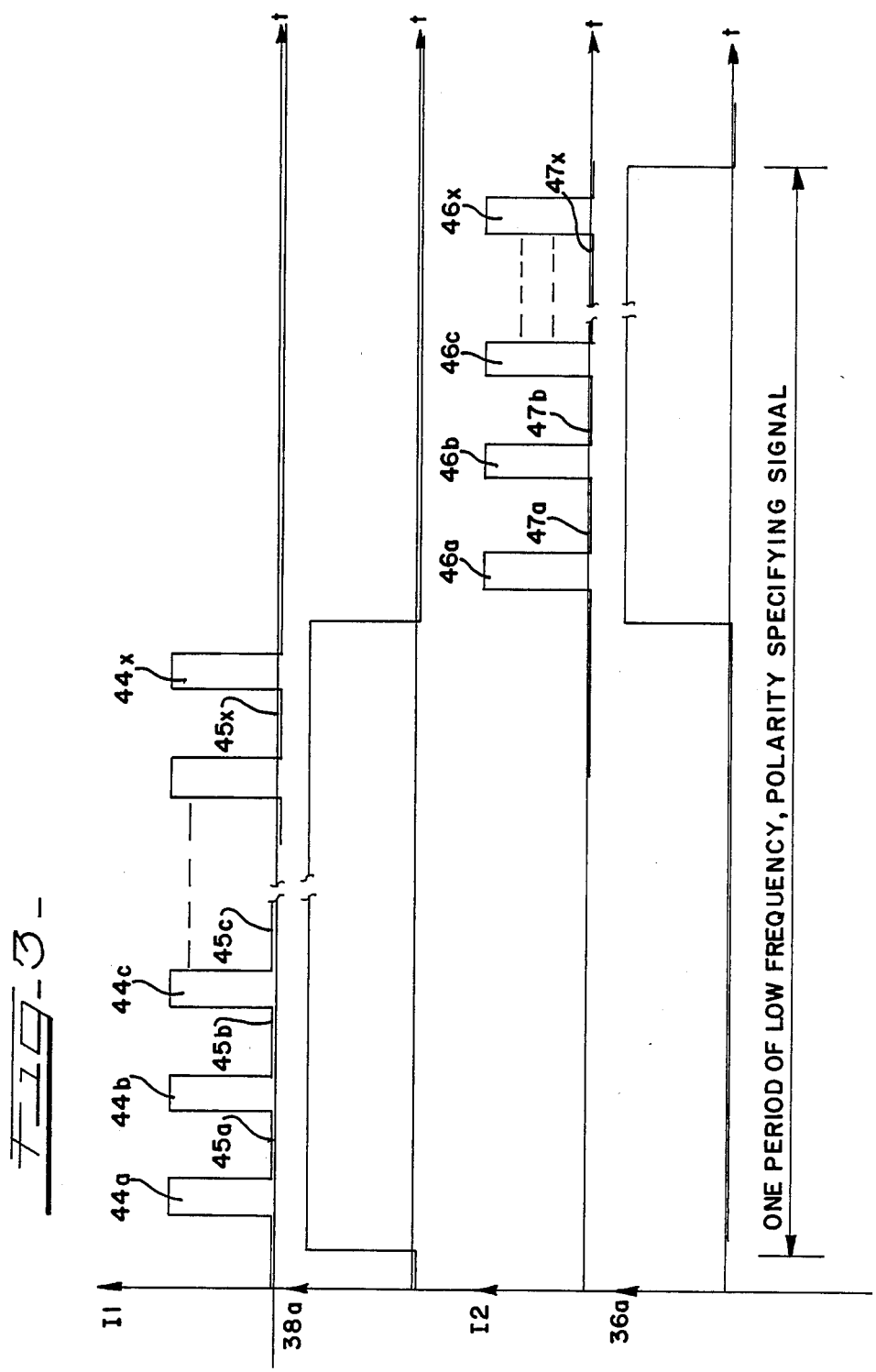

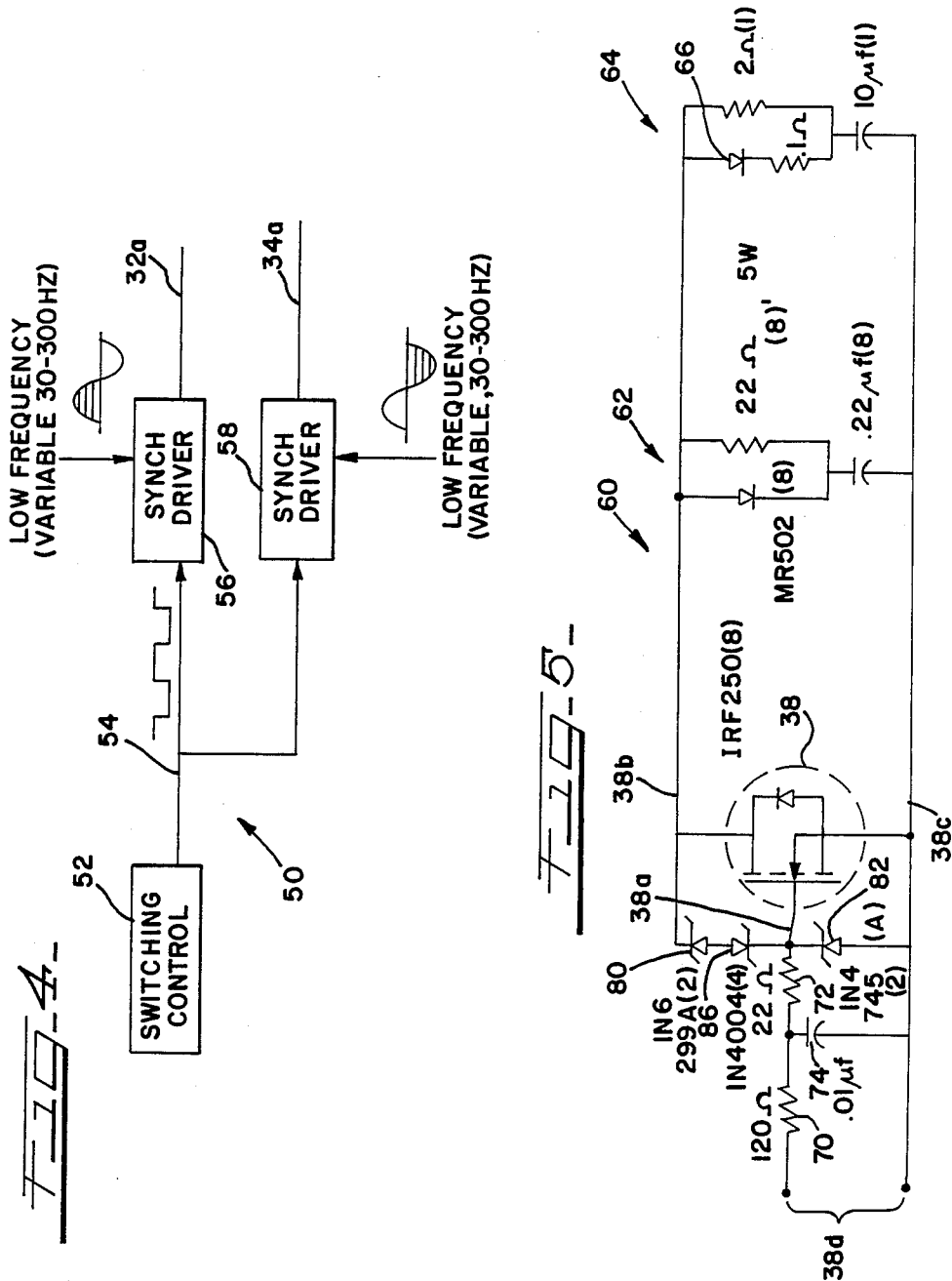

WELDING SYSTEM WITH ELECTRONIC CONTROL

FIELD OF THE INVENTION

The invention pertains to welding systems with electronic controls. More particularly, the invention pertains to a welding system with a solid state switching control system located in the secondary of the power transformer.

BACKGROUND OF THE INVENTION

Solid state switching power supplies for use with welding equipment are generally known. Both transistors and silicon controlled rectifiers (SCR) have been used for this purpose.

Switching transistors as is known, display significant turn on and turn off delay characteristics especially when used in high current applications. Hence, where high speed switching is desirable or necessary, these turn on and turn off delays can be substantial limiting factors.

Silicon controlled rectifiers, as is known, are easily turned on by an applied gate voltage but cannot be turned off by that gate voltage. Rather, some sort of commutation arrangement or applied alternating voltage must be utilized. In an alternating current environment, the SCRs can be readily turned off. However, in a DC environment, this poses more of a problem.

Thus, there continues to be a need for solid state high frequency switching supplies usable in high current environments which can also be switched at relatively high rates. Further, there continues to be a need for supplies that are readily usable in DC environments.

SUMMARY OF THE INVENTION

In accordance with the invention, a welding system with an electronic control is provided. The system includes a solid state, electronic control unit. The solid state unit includes switching elements located in the secondary, low voltage, high current side of the system power transformer.

In one embodiment of the invention, a DC arc welding system is provided. This system includes a source of DC current and relatively low voltage. A switching element is coupled between the low voltage output of the source and an energy storage device such as an inductor. The inductor is in turn coupled to a load represented by an output electrode and the metal members being welded.

A rectifier is coupled in parallel across the inductor and the load so as to form a closed electrical loop. The metal members are coupled to the other output of the low voltage source to complete the circuit.

A source of high frequency control signals is provided to turn the switching element on and off at a predetermined rate. During periods when the switching element is on, electrical energy flows from the relatively low voltage source to the inductor and the load. During periods when the switching element is off, current flows in the closed electrical loop and provides electrical energy to that load. A constant polarity DC arc can be maintained between the electrode and the metal members being welded. Varying the frequency of the control signals alters the power delivered to the load.

In another embodiment of the invention, a source of relatively low voltage DC is provided. A switching system having four interconnected solid state switching elements is coupled across the low voltage source. The structure of the switching system, with respect to the source, is similar to a bridge circuit.

An inductive storage element is coupled between two legs of the bridge. A load, including output electrodes and the metal members to be welded, is coupled between the inductor and the other two legs of the bridge.

A source of relatively low frequency signals, in a range of 30 to 300 Hz, turns the two switching elements in the legs of the bridge-like structure, coupled to the inductor alternately on and off. A source of relatively high frequency, in a range of 5 KHz to 25 KHz, continually turns the two switching elements in the other legs of the bridge-like structure on and off.

Polarity of the output arc is determined by which of the two relatively low frequency switching elements is turned on at any given time. The output power can be adjusted by altering the high frequency rate. By alternately turning the one pair of switching elements on and off at the relatively low rate, an AC arc of variable frequency can be generated between the output electrode and the members to be welded.

A method of controlling an AC arc between an electrode and a metal member is also provided. This method includes:

providing a source of relatively low voltage of a predetermined polarity with a relatively high output current;

providing a bridge connected, four branch switching system between the source and the load;

switching first and second switching branches at a relatively low, polarity determining rate;

switching third and fourth switching branches at a relatively high, power determining rate;

enabling a current flow in a first direction during periods when the first and the third switching branches are turned on; and enabling a current flow opposite the first direction during periods when the second and fourth switching branches are turned on.

In a preferred form of practicing the method an inductor stores energy during periods when either the third or fourth switching elements are turned on. The inductor gives up energy to the arc during periods when the third and fourth switching elements are both turned off. The method also provides for adjusting the rates at which the third and fourth elements are switched thereby adjusting the power delivered to the arc.

The invention also provides for generating a DC arc of a selectable polarity. The method includes the steps of:

selecting the desired polarity of arc by turning on a first or a second switching element; and providing electrical energy for the arc by switching a respective third or a fourth switching element on and off and adjusting the rate of switching the third or fourth element to vary the rate that energy is supplied to the arc.

The DC source can be energized by means of a constant frequency AC input such as 60 Hz or 400 Hz. Alternately, the AC input can have a variable frequency such as would be generated by an alternator driven off of a variable speed internal combustion engine. In cases where an AC output is required from the switching system, the input AC signal can be used to synchronize a control system. The control system can sense positive and negative half cycles of the input AC waveform. Two out-of-phase pulse trains can be generated in response to the input AC signal.

One pulse train can be positive going during time periods when the input AC signal is positive going. The second pulse train, 180 degrees out of phase with the first pulse train, can be positive going during time periods when the input AC signal is negative going.

The first and second pulse trains can be used to switch the two relatively low frequency devices. The same two pulse trains can also be used to synchronize switching of the two relatively high speed, power controlling switching devices.

By switching the low frequency devices with the two pulse trains, an alternating load current can be generated. This load current will have the same frequency as the input AC waveform.

By synchronizing the high frequency devices with the input AC signal, the power controlling switching devices will be switched on and off only during the appropriate half cycle of that AC signal. As a result, by varying the high frequency input signal, variable power can be applied to the load while the load current is regularly changing direction as is required for AC welding.

To suppress voltage transients as the various switching devices are being turned on and off, resistor-capacitor (RC) circuits having short time constants can be used. In a preferred embodiment, gate controllable field effect transistors can be used as the switching elements. Such transistors are major carrier devices that have short turn-off time intervals even when relatively high currents are flowing therethrough. A relatively low current, three amp, relatively high speed diode can be included in a first RC circuit located adjacent the switching device to enhance such switching. A relatively high current, seventy amp, somewhat lower speed diode can be included in a second RC circuit. The second RC circuit can have a longer time constant than the first circuit.

The first RC circuit will switch on at high speed as the adjacent field effect transistor is turned off. Simultaneously, as the transient voltage tends to increase, due to the transistor turning off, the second RC circuit, including the slower diode, will begin to conduct thereby providing a higher capacity path, with a longer time constant, through which inductively related energy can be dissipated.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE DRAWINGS

FIG. 1 is an overall block diagram of a welding system in accordance with the present invention;

FIG. 2 is a schematic diagram of an alternate welding control system in accordance with the present invention;

FIG. 3 is a timing diagram that illustrates exemplary signals present in the control system of FIG. 2;

FIG. 4 is an overall block diagram of a switching control circuit usable with the system of FIG. 2;

FIG. 5 is a schematic diagram illustrating parallel connections of several MOS transistors.

DESCRIPTION OF THE PREFERRED EMBODIMENT

Figure 6:
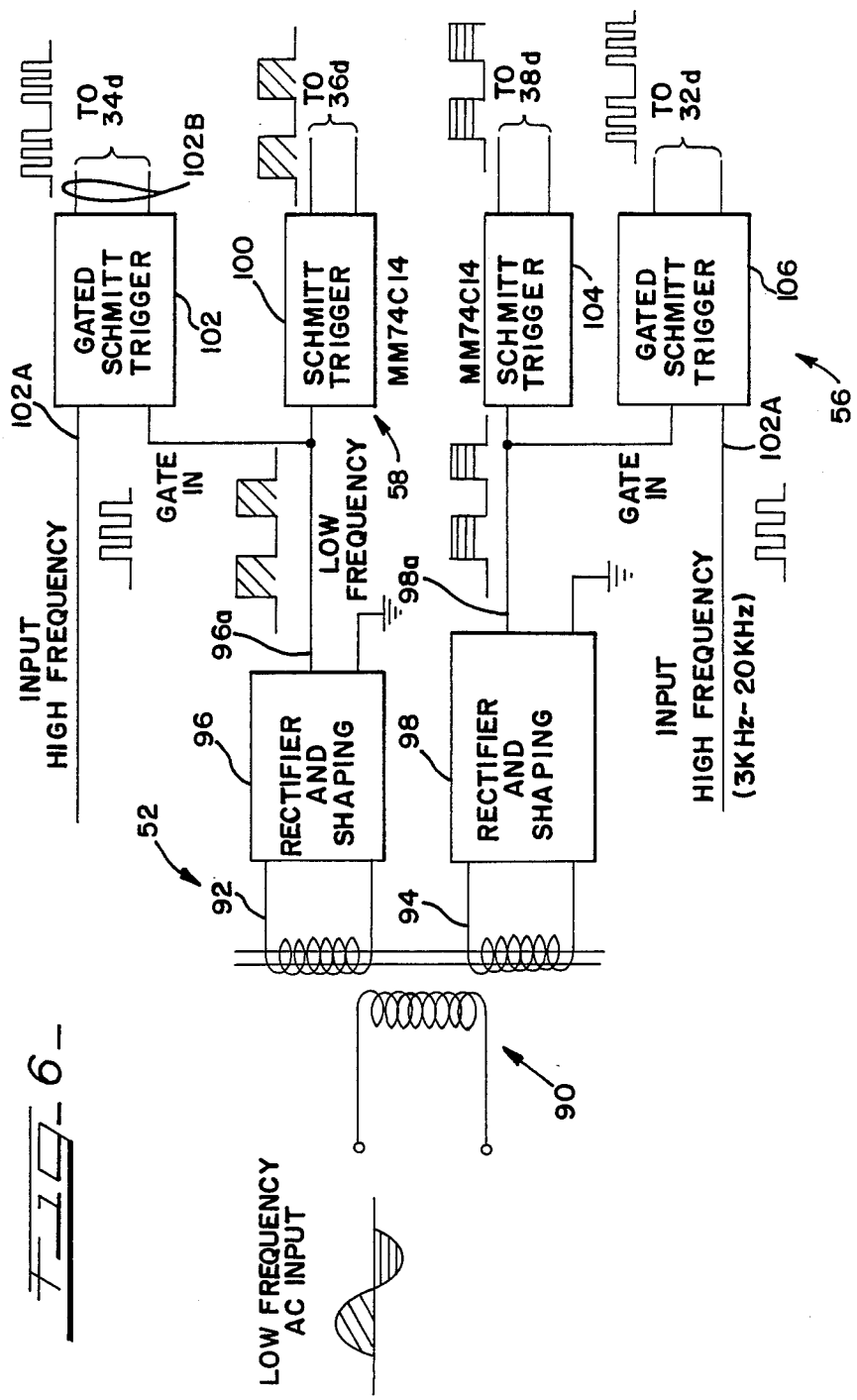
FIG. 6 is a schematic block diagram of the switching control circuit of FIG. 4.

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an overall block diagram of a welding system 10 in accordance with the present invention. The welding system 10 includes a power transformer 12 which may be single-phase or multi-phase, such as a three-phase transformer. The transformer 12 receives electrical energy from a convenient source of AC input power. The AC input signals can have a constant or a variable frequency.

Output from the power transformer 12 is converted in DC supply 14 to approximately 80 volts DC output. The DC supply 14 is coupled to the secondary, or the low voltage side, of the power transformer 12. Output currents from the DC supply 14 can be expected to be in a range of 20 to 220 amps. A solid state switch 16 is coupled to an output of the DC supply 14. The switch 16 is turned on and off by control signals on an input line 18.

The switch 16 coupled to an inductor 20 as well as a cathode of a rectifier diode 22. The inductor is in turn coupled to an output electrode 24 which forms part of the system load.

The load includes the electrode 24, and metal members 26 which are to be welded. An arc is to be created and maintained between the electrode 24 and the members 26. The members 26 are in turn coupled to an anode of the diode 22 and a second output of the DC supply 14.

During time intervals in which the switch 16 is in a conducting, or on, state, current can flow from the DC supply 14, through the switch 16, the inductor 20 through the load, the electrode 24, the metal members 26 and back to the supply 14.

During time intervals when the switch 16 is in a non-conducting, or off, state, a closed current loop is formed by the inductor 20, the load having electrode 24 and metal members 26 and the rectifier diode 22. A current I flows in the loop during these time intervals. Thus, the arc between the output electrode 24 and the members 26 being welded can be maintained during intervals when the switch 16 is in its off state.

By adjusting the frequency of the signals on the control line 18, the power delivered to the load can be adjusted. Typical output voltages for the system 10 are 40 volts at 200 amps.

The switch 18 could be implemented by means of one or more power MOS field effect transistors. Devices sold by International Rectifier or Siemens such as type number IRF 250 have been found suitable. Field effect transistors are especially advantageous in that they can be turned on and off by a gate input voltage. No commutation is needed as is the case with silicon controlled rectifiers. In addition, since field effct transistors are majority carrier devices, they can be quickly turned off even at high load currents.

While the system 10 can be used to create a fixed polarity, DC output arc, it is inconvenient in that the polarity of the output arc cannot be readily reversed. Nor does the system 10 provide an AC output as would be used in tungsten inert gas (tig) welding.

FIG. 2 illustrates a schematic of an electronic control system 30 which is more versatile. The electronic system 30 can also be powered from the DC supply 14. The system 30 includes four solid state switches, 32 through 38. The switches 32 through 38 are coupled together to form a bridge. Each switch represents a leg or branch of the bridge.

Each of the switches 32 through 38 can be implemented by means of a power MOS field effect transistor such as type IRF 250 and represented by a schematic symbol as in the case of switch 32. Based on desired load currents, it might be desirable to connect a plurality of such switches in parallel in each branch. Each of the switches 32 through 38 includes a control input, such as the input 32a which is coupled to a high-input impedance gate of the device. Each of the switches also includes a diode, such as the diode 32b which is integrally formed with the device.

An inductor 40 with a center tap 40a is coupled between the switches 36 and 38. The load 42 is coupled between switches 32 and 34 and the center tap 40a of the inductor 40 via terminals T1 and T2. The load 42 includes an output electrode and the metal members to be welded. The system 30 functions to maintain an arc in the load between terminals T1 and T2.

The load 42 corresponds to the output electrode 24 and metal members 26 to be welded as illustrated in FIG. 1. The system 30 has the advantage that it can be used with DC arc welders as well as AC welders, such as tig welders.

Switches 32 and 34 are switched at a relatively high rate in a range of 8 KHz to 20 KHz, and are used to adjust the power supplied to the load 42. Switches 36 and 38 are switched at a relatively low rate in a range of 60 Hz to 100 Hz, and are used to establish the polarity of the voltage and current applied to the load 42.

For example, if switches 34 and 36 are off and switch 38 is on for a relatively long period of time, turning switch 32 off and on at a relatively high rate will cause a current $I_1$ to flow through the load 42 with the polarity indicated in FIG. 2. As illustrated in FIG. 3 the pulse current $I_1$ will flow from the DC supply 14 through the switch 32, through the load 42, a portion of the inductor 40, and the switch 38 during a plurality of spaced apart time intervals 44a–44x when the switch 32 is in a conducting or on state. Provided switch 38 continues to be conducting, as illustrated in FIG. 3, by a gate voltage applied to the gate input 38a the current $I_{1LOOP}$ will flow in a closed electrical loop formed of the switch 38, the diode in the switch 34, the load 42 and a portion of the inductor 40 during a second plurality of spaced apart time intervals 45a–45x when the switch 32 is turned off.

If switch 38 is now turned off for a relatively long period of time and switch 36 is turned on for the same relatively long period of time, a pulse current $I_2$ will flow through the load 42 in the opposite direction as indicated with the indicated polarity. With respect to FIG. 3, the switch 34 is switched on and off at the relatively rapid rate, pulses of current 46a through 46x will flow from the DC supply 14, through the switch 36, through a portion of the inductor 40, the load 42 and the switch 34. During a plurality of spaced apart time intervals 47a through 47x when the switch 34 is turned off, the loop current $I_{2LOOP}$ will flow in a closed electrical loop including the load 42, the diode 32B, the switch 36 and a portion of the inductor 40.

If the switches 36 and 38 are alternately turned on and off at the relatively low rate noted above, the system 30 functions so as to generate an AC arc in the load 42 between the terminals T1 and T2. By holding either the switch 36 on or the switch 38 on, and switching switch 32 or switch 34 at a relatively high rate, respectively, the system 30 will function as a DC arc welder with a reversible polarity. Merely reversing which of the switches 36 or 38 is turned on and which is turned off will change the polarity of the output DC arc.

The switches 36 and 38 can be switched on and off by means of input gate voltages derived from the AC input voltage. This can be a constant frequency 60 Hz signal. Alternately, it can be a signal with a variable frequency in a range of 30–300 Hz.

It should be noted that with respect to the system 30, the duty cycle of the switches 36 and 38 can be altered based on the characteristics of the type of welding desired with respect to the load 42. As illustrated in FIG. 3, switches 32 and 34 are off for a longer period than they are on.

For example, in AC tig welding, it is well known that there are advantages to operating with an asymmetrical duty cycle with respect to the load. The system 30 provides for ready adjustment of the duty cycle by varying the turn-on time of the switch 36 with respect to the switch 38. With respect to FIG. 3, the turn-on time of the switch 38, correspondig to the duration of the applied gate voltage 38a, is longer than the turn-on time of the switch 36, corresponding to the duration of the gate voltage 36a. In addition, the turn-on time of the switches 32 or 34 can be readily adjusted to provide current pulses $I_1$ or $I_2$ that have asymmetrical duty cycles.

With respect to DC arc welding, using the system 30, it would be possible to start the arc with a negative electrode if desired and then switch to a positive electrode merely by reversing the on and off condition of the switches 36 and 38. This is very advantageous in that this is a change at low power that produces a high power polarity reversal.

It should also be noted that the inductor 40 is preferably wound with the indicated polarities such that a magnetic field set up in the inductor when one portion of it is conducting is in the appropriate direction for a subsequent time interval when the other portion of the inductor is conducting. As a result, the switching process is in phase with the voltage across the inductor.

One form of inductor 40 that has been found especially useful has a tapered air gap. Such inductors are commercially available such as for example, Part No. AIRCO 1373-3923. Such inductors are designed to produce a constant percent of ripple to current throughout the 20-220 amp output current range of the welding system 10.

The system 30 of FIG. 2 thus has the advantage of of being flexible and can be used in connection with optimizing various welding processes. It provides greater arc control than has heretofore been possible and is very efficient when used in connection with AC tig welding.

A switching control system 50, usable with the power control system 30, is illustrated in block diagram form in FIG. 4. The system 50 includes a switching control unit 52 which can be implemented by a pulse width modulation control chip type SG1526. Relatively high frequency (3 KHz to 20 KHz) output from the switching control unit 52 on a line 54 is coupled to first and second synchronized drivers 56 and 58.

Drivers 56 and 58 are synchronized by means of the low frequency switching signals which are used as inputs to the switches 36 and 38 on the lines 36A and 38A. This synchronization provides that driver 56 will only conduct at times when driver 58 is not conducting. Outputs from the synchronized drivers 56 and 58 are coupled to the input lines 32a and 34a of the high speed power controlling switches 32 and 34.

FIG. 5 illustrates a schematic 60 with a plurality of high speed field effect switching transistors, such as the transistor 38 coupled in parallel. Coupling the field effect transistors in parallel provides for substantially higher output load currents, such as I1 and I2, then could be achieved with a single field effect transistor. For example, the load currents I1 and I2 can vary in a range between 20 and 220 amps.

FIG. 5 illustrates field effect transistor 38. The transistor as noted previously can be a type IRF 250. In parenthesis after the type number is the number "8" indicating that in a preferred embodiment a total of eight such field effect transistors, including the transistor 38 would be coupled in parallel.

The circuit 60 also illustrates a high speed transient suppression resistor-capacitor (RC) circuit 62 coupled in parallel across the transistor 38. There is one circuit 62 for each of the IRF 250 field effect transistors. The MR502 diode switches relatively fast but has a relatively low, three amp rating.

The circuit 60 also illustrates a single lower speed RC voltage suppression circuit 64 which is coupled across all eight of the IRF 250 field effect transistors. As the field effect transistors are turned off, voltage on the line 38B tends to increase due to the effects of the inductor 40. The high speed RC suppression circuit 62, including the relatively high speed diode MR 502, limit the voltage pulse on the line 38B during the turn-on time of the higher current diode 66 in the lower speed RC suppression circuit 64. The diode 66 can be, for example, a type 70HFLR20S02 by International Rectifier. This is a 70 amp, 200 volt diode. In comparison, the MR 502 diode noted above is a three amp, 200 volt diode.

The RC suppression circuits 62 and 64 are both desirable because the field effect transistors such as the transistor 38 are very high speed, majority carrier, devices which turn-off very quickly. This turn-off time exceeds the turn-on time of the diode 66.

The same output RC circuitry is used with each field effect transistor 32 through 38.

FIG. 5 also illustrates the input circuitry connected to each of the field effect transistors such as the transistor 38. The same input circuitry is used for all transistors 32 through 38. This circuitry includes an RC network associated with each gate input line, such as the input line 38A. This RC network includes a pair of resistors 70, 72 along with capacitor 74. Additionally, a pair of voltage clamps 80, 82 implemented as Zener diodes are provided for each group of four field effect transistors. Each pair of field effect transistors also includes a switching diode 86 in the input circuitry.

It will be understood, of course, that fewer or more field effect transistors could be connected in parallel as illustrated in FIG. 5 without departing from the spirit and scope of the present invention. The particular, detailed interconnection of a plurality of field effect switching transistors, such as a transistor 38 would depend on the characteristics of the specific selected field effect transistor.

FIG. 6 illustrates in greater detail, a block diagram schematic of the switching control and synchronized drivers of FIG. 4. The low frequency AC input used to switch the transistors 36 and 38 is provided to a primary input of a transformer 90. This can be the same AC input signal as is supplied to the primary of the power transformer 12.

The transformer 90 has commonly wound first and second secondary coils 92 and 94. Output from each of the secondary coils 92 and 94 can be rectified and shaped in rectifier and shaping elements 96 and 98. Output from the circuit elements 96 and 98 on lines 96A and 98A respectively corresponds to two out-of-phase pulse trains. The pulse train on the line 96a is upgoing on the positive half cycle of the AC input to the transformer 90. The pulse train on the line 98a is upgoing on the negative half cycle of that same input wave form.

The low frequency pulse train on the line 96A provides an input to the Schmitt trigger 100. Output from the Schmitt trigger 100 can be electrically connected, via driver circuitry, to the gate input of the switching field effect transistor 36. Transistor 36 has the same input circuitry as does transistor 38 illustrated in FIG. 5. Varying the width of the output signal from the Schmitt trigger 100 will change the duty cycle of the output circuit.

The low frequency pulse train on the line 96A can also provide a gating input to a second Schmitt trigger 102. A pulse input to the Schmitt trigger 102 is provided on a line 102A from a high frequency oscillator of any known design. The high frequency signals on the line 102A, when gated by input signals on the line 96A provide an intermittent, synchronized, high frequency, pulse train on output lines 102B. This intermittent pulse train can then be connected electrically to the gate input 34d of the field effect transistor 34. This gated high frequency pulse train on the lines 102B will then be effective to switch the transistor 34 during time intervals which correspond to the time intervals 44a through 44x of FIG. 3. Similarly, the width of the output pulse from the Schmitt trigger 102 can be varied.

During intervening low frequency periods or time intervals corresponding to the negative going portion of low frequency AC input signal, the low frequency pulse train on the line 98A provides a switching input to a Schmitt trigger 104. Output from the Schmitt trigger 104 can be electrically connected to the low frequency field effect transistor 38 to provide input to that device as illustrated in FIG. 5. Hence, the field effect transistor 38 can be switched on during periods when the low frequency AC input signal is going through its negative half cycle.

In addition, a second gated Schmitt trigger 106 is also provided. The low frequency pulse train on the line 98A provides a gate input signal to the Schmitt trigger 106. The high frequency input signal on the line 102A is also coupled to the switching input of the Schmitt trigger 106. Output from the Schmitt trigger 106 is a high frequency, intermittent, pulse train present during time periods 46a through 46x as illustrated in FIG. 3 and synchronized so as to be only generated during those intervals when the low frequency AC input signal is passing through its negative half cycle. The output pulse widths of the Schmitt triggers 104 and 106 can also be varied.

It will be understood that any one of a plurality of Schmitt triggers could be used to implement the circuitry of FIG. 6. The exact implementation of the selected Schmitt trigger is not a limitation of the present invention. For example, and without limitation, a Motorola type MM74C14 could be used. It will be understood that the outputs of the Schmitt triggers 100–106 could be connected to gating or driver circuitry if additional current or power is required at the gate inputs of the switching field effect transistors 32 through 38. In addition, it will be understood by those of skill in the art that a variety of rectifier and shaping circuits could be used to implement elements 96 and 98. The exact implementation of those elements is not a limitation of the present invention. Either full or half-wave rectification circuits could be used for this purpose.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of supplying variable output power and an output current to an output electrode and selected, adjacent metal members comprising:
   providing a source of varying input voltage and current of a selected period;
   transforming the input voltage and current to a selected direct voltage and current;
   establishing an output current polarity determining signal with a period related to the input period;
   switching the selected direct voltage and current to form the output current only during selected, spaced-apart time intervals within a portion of each period of the polarity determining signal;
   varying the output power by adjusting the spaced-apart switching time intervals;
   supplying the switched voltage and current to the electrode and the selected metal members; and
   forming an electrical loop for supplying output current during other selected, spaced-apart time intervals, to the electrode and the selected metal members such that an arc is maintained between the electrode and the metal members.

2. A method as in claim 1 including storing electrical energy during at least selected of the spaced-apart time intervals.

3. A method as in claim 2 including storing energy during the first plurality of spaced-apart time intervals and providing energy during a second plurality of time intervals so as to maintain an arc of a first polarity between the electrode and the metal members.

4. A method as in claim 3 including generating an electrical switching signal usable for switching the selected voltage and current at a selected rate.

5. A method as in claim 3 including periodically reversing the polarity of the output arc.

6. A method as in claim 3 including adjusting the duration of members of said first plurality of time intervals.

7. A method as in claim 3 including interposing at least some members of said first plurality between members of said second plurality.

8. A system for supplying electrical energy to a load including an output electrode and selected, adjacent metal members comprising:
   means for transforming an applied varying relatively low frequency input signal of a selected voltage and current to a selected, relatively low voltage with a selected polarity and a selected direct current at first and second terminals;
   a plurality of field effect transistors interconnected to form a bridge having first, second, third and fourth branches with at least one of said field effect transistors in each said branch, said bridge coupled across said first and second terminals;
   a selectively wound inductive element having a center tap and first and second end connections and coupled by said end connections between said first and second branches of said bridge with said center tap connectable to one end of the load;
   a connection between said third and said fourth branches connectable to a second end of the load; and
   control means for varying the polarity and duty cycle of a load current including means for varying the pulse width of the load current so as to adjust the power delivered to the load with said control means including, means for sensing the varying relatively low frequency input signal,
   means for forming first and second out of phase pulse trains each having a frequency corresponding to the input signal,
   gated means for forming third and fourth relatively high frequency pulse trains with said third pulse train formed only during a selected region of said first pulse train and said fourth pulse train formed during a selected region of said second pulse train with said first and third pulse trains coupled to respective of said field effect transistors in said first and third branches and with said second and fourth pulse trains coupled to respective of said field effect transistors in said second and fourth branches such that said polarity and frequency of said load current correspond to the polarity and frequency of the applied input signal and said duty cycle corresponds to said frequency of said third and said fourth pulse trains.

9. A system as in claim 8 wherein each said pulse train forming means includes Schmitt trigger means for generating each said respective pulse train.

10. A system as in claim 8 wherein each said branch includes a plurality of parallel connected field effect transistors.

11. A system as in claim 8 wherein each said field effect transistor has coupled thereto a resistor-capacitor circuit having a first, relatively short, time constant for suppressing transient voltage as said transistor is being turned off, said resistor-capacitor circuit including a relatively high speed switching diode.

12. A system as in claim 11 wherein selected parallel connected groups of said field effect transistors in each said branch each have coupled thereto a common resistor-capacitor circuit having a second, relatively short time constant, longer than said first time constant, for suppressing transient voltage as said transistors are being turned off, said common resistor-capacitor circuit includes a lower speed, high current switching diode.

* * * * *